(12) United States Patent
Williams et al.

(10) Patent No.: US 9,102,354 B2
(45) Date of Patent: Aug. 11, 2015

(54) APPARATUS FOR USE IN TURNING STEERABLE VEHICLE WHEELS

(75) Inventors: Daniel E. Williams, Lebanon, IN (US); Elbert Owens, Lafayette, IN (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 0 days.

(21) Appl. No.: 13/988,537

(22) PCT Filed: Dec. 7, 2011

(86) PCT No.: PCT/US2011/063680
§ 371 (c)(1),
(2), (4) Date: May 21, 2013

(87) PCT Pub. No.: WO2012/078719
PCT Pub. Date: Jun. 14, 2012

(65) Prior Publication Data
US 2013/0240287 A1    Sep. 19, 2013

Related U.S. Application Data

(60) Provisional application No. 61/420,426, filed on Dec. 7, 2010.

(51) Int. Cl.
| B62D 5/06 | (2006.01) |
| B62D 5/22 | (2006.01) |
| B62D 5/00 | (2006.01) |
| B62D 5/087 | (2006.01) |
| B62D 5/09 | (2006.01) |
| B62D 5/12 | (2006.01) |
| B62D 6/00 | (2006.01) |

(52) U.S. Cl.
CPC .. *B62D 5/22* (2013.01); *B62D 5/00* (2013.01); *B62D 5/06* (2013.01); *B62D 5/087* (2013.01); *B62D 5/09* (2013.01); *B62D 5/12* (2013.01); *B62D 6/008* (2013.01)

(58) Field of Classification Search
CPC ......... B62D 5/0463; B62D 5/00; B62D 5/065
USPC .................................. 180/403, 421, 422, 423
See application file for complete search history.

(56) References Cited

U.S. PATENT DOCUMENTS

| 4,735,271 A | * | 4/1988 | Shimizu ........................ 180/446 |
| 6,219,604 B1 | * | 4/2001 | Dilger et al. .................... 701/41 |
| 6,546,322 B2 | * | 4/2003 | Williams ........................ 701/41 |
| 7,055,646 B2 | * | 6/2006 | Bugosh .......................... 180/444 |
| 7,909,132 B2 | * | 3/2011 | Szabela et al. ................. 180/446 |
| 2004/0148080 A1 | * | 7/2004 | Ekmark et al. .................. 701/41 |

(Continued)

*Primary Examiner* — Joseph Rocca
*Assistant Examiner* — Gabriela C Craciun
(74) *Attorney, Agent, or Firm* — Tarolli, Sundheim, Covell & Tummino LLP

(57) ABSTRACT

An apparatus (10) for use in turning steerable vehicle wheels (14, 16) includes a steering member (12) which is linearly movable relative to the vehicle to effect turning movement of the steerable vehicle wheels. A pinion (28) is disposed in meshing engagement with a rack portion (30) of the steering member (12). A steering column (22) is connected with the pinion (28) and with a vehicle steering wheel (20) such that rotation of the steering wheel results in linear movement of the steering member. An electrically powered steering unit (40) is connected to the steering member (12) for providing steering feel to the operator. A hydraulic power steering motor (60) mechanically connected to the steering member provides steering assist to the steerable wheels (14, 16).

20 Claims, 1 Drawing Sheet

(56) References Cited

U.S. PATENT DOCUMENTS

2005/0236220 A1 10/2005 Soeda et al.
2010/0018796 A1 1/2010 Peterson
2010/0070136 A1 3/2010 Williams et al.
2010/0152971 A1* 6/2010 Shiino et al. .................... 701/41
2010/0168964 A1 7/2010 Higashi et al.

* cited by examiner

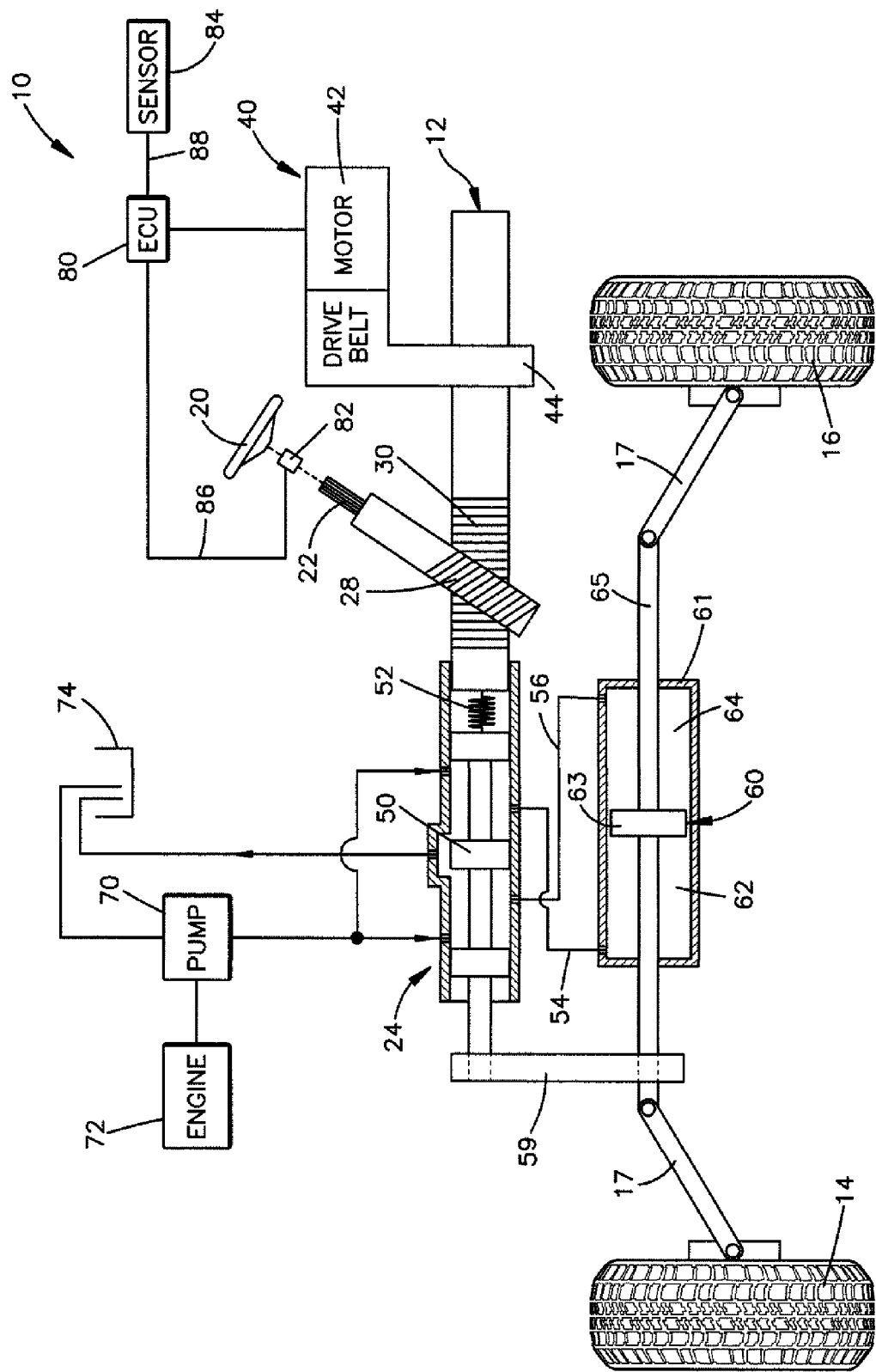

APPARATUS FOR USE IN TURNING STEERABLE VEHICLE WHEELS

RELATED APPLICATIONS

This application corresponds to PCT/US2011/063680 filed Dec. 7, 2011, which claims the benefit of U.S. Provisional Appln. Ser. No. 61/420,426, filed Dec. 7, 2010, the subject matter of which are incorporated herein by reference in their entirety.

TECHNICAL FIELD

The present invention relates to an apparatus for use in turning steerable vehicle wheels.

BACKGROUND OF THE INVENTION

A known vehicle steering apparatus includes a steering member which is linearly movable to effect turning movement of steerable vehicle wheels. A pinion is disposed in meshing engagement with a rack portion of the steering member. A steering column interconnects the pinion and a vehicle steering wheel.

In addition, this known steering apparatus includes a ball nut assembly which is connected with an externally threaded portion of the steering member. A motor is connected with the ball nut assembly. The motor is operable to effect rotation of the ball nut assembly relative to the steering member in order to provide steering assist. A steering apparatus having this general construction is disclosed in U.S. Pat. Nos. 4,735,271 and 7,055,646.

SUMMARY OF THE INVENTION

In accordance with the present invention an apparatus for use in turning steerable vehicle wheels includes a steering member which is linearly movable relative to the vehicle to effect turning movement of the steerable vehicle wheels. A pinion is disposed in meshing engagement with a rack portion of the steering member. A steering column is connected with the pinion and with a vehicle steering wheel such that rotation of the steering wheel results in linear movement of the steering member. An electrically powered steering unit is connected to the steering member for providing steering feel to the operator. A hydraulic power steering motor mechanically connected to the steering member provides steering assist to the steerable wheels.

In accordance with another aspect of the present invention, an apparatus for use in turning steerable vehicle wheels includes a steering member which is linearly movable relative to the vehicle to effect turning movement of the steerable vehicle wheels. A pinion is disposed in meshing engagement with a rack portion of the steering member. A steering column is connected with the pinion and with a vehicle steering wheel such that rotation of the steering wheel results in linear movement of the steering member. A controller is electrically connected to at least one vehicle condition sensor that senses a vehicle condition and provides an electrical signal indicative of the sensed vehicle condition. An electrically powered steering unit is mechanically connected to the steering member and electrically connected to the controller for applying an axial force to the steering member in response to the sensed vehicle condition for providing steering feel to the operator. A hydraulic power steering motor is mechanically connected to the steering member to provide steering assist to the steerable wheels.

BRIEF DESCRIPTION OF THE DRAWINGS

The foregoing and other features of the present invention will become more apparent to those skilled in the art to which the present invention relates upon reading the following description with reference to the accompanying drawings, in which:

FIG. 1 is a schematic illustration of an embodiment of an apparatus for turning steerable wheels of a vehicle constructed in accordance with the present invention.

DETAILED DESCRIPTION

The present invention relates to an apparatus for use in turning steerable vehicle wheels. FIG. 1 illustrates an apparatus 10 constructed in accordance with the present invention and used to turn steerable vehicle wheels. The apparatus 10 includes a steering member 12 which is connected to steerable vehicle wheels 14 and 16 by a steering linkage 17. A pinion 28 is in meshing engagement with a rack portion 30 of the steering member 12 such that rotation of the pinion results in axial or linear movement of the rack portion. In particular, the rack portion 30 includes rack gear teeth disposed in meshing engagement with gear teeth on the pinion 28. The pinion 28 connects to a steering column 22 that includes a rotatable steering wheel 20.

Upon rotation of the steering wheel 20, force is transmitted through the steering column 22 to the pinion 28. The pinion 28 thereby rotates under the influence of force transmitted through the steering column 22. Due to the meshed engagement between the pinion 28 and the rack portion 30 rotation of the steering wheel 20 and, thus, rotation of the pinion results in linear movement of the rack portion of the steering member 12. Accordingly, rotation of the steering wheel 20 results in turning of the steerable vehicle wheels 14, 16.

An electrically powered steering unit 40 (EPS unit) connected to the steering member 12 controls the steering torque applied to the steering wheel 20. In other words, the EPS unit 40 may be operated to affect linear movement of the rack portion 30 of the steering member 12, which resists rotation of the steering wheel 20 to provide "feel" to the operator rotating the steering wheel. The EPS unit 40 is mechanically coupled to the rack portion 30. More specifically, the EPS unit 40 includes a reversible electric motor 42 coupled to a drive belt 44 which is mechanically connected to the steering member 12 for effecting linear movement of the rack portion 30 by applying an axial force to the steering member. The EPS unit 40 may have the same construction as is disclosed in U.S. Pat. Nos. 7,055,646 and 7,909,132, the entirety of which are incorporated herein by reference. The EPS unit 40 may alternatively have a different construction if desired.

The apparatus 10 includes a hydraulic power steering motor 60 that provides steering assist. A bracket or support member 59 mechanically connects the motor 60 to the steering member 12. The motor 60 includes a cylinder 61 that defines a pair of fluid chambers 62, 64 positioned on opposite sides of a movable piston 63. A rod 65 connects the piston 63 to each steering linkage 17.

A valve 24 directs hydraulic fluid to and from the motor 60. In particular, the valve 24 is a linear valve with a portion that moves in response to linear movement of the steering member 12. The linear valve 24 may function similarly to the rotary valve disclosed in U.S. Patent Application Publication No. 2010/0018796, the entirety of which is incorporated herein by reference. Although a linear valve 24 is shown, it is contemplated that a rotary valve connected with the rotating pinion 28 may be used for directing hydraulic fluid to and from the motor 60.

The linear valve 24 includes a spool 50 connected to the bracket 59. Therefore, the spool 50 moves together with the rod 65 of the motor 60 via the bracket 59. The spool 50 is mechanically coupled to the steering member 12 and, in particular, is coupled to the end of the linearly moving rack portion 30. A biasing element 52, such as a spring, connects the spool 50 to the end of the rack portion 30. The linear valve 24 is an open center valve but may alternatively be closed center. The biasing element 52 may linearly bias the valve 24 into an unactuated, neutral position in which hydraulic fluid is directed to both chambers 62, 64 of the steering motor 60 but does not affect movement, i.e., actuation, of the steering motor. The neutral position corresponds with a straight-ahead position of the steering wheel 20, i.e., the operator is not turning the steering wheel 20.

The apparatus 10 includes a pump 70 in fluid communication with the valve 24 for supplying hydraulic fluid to the steering motor 60. The pump 70 draws hydraulic fluid from a fluid reservoir 74 and supplies hydraulic fluid to the inlet of the valve 24. The pump 70 may be operatively connected to the engine 72 of the vehicle and driven by the engine of the vehicle. It is contemplated that the pump 70 may be driven by an electric motor. The pump 70 may be a fixed displacement pump or a variable displacement pump in accordance with the present invention.

The valve 24 is connected to fluid lines 54, 56 for selectively directing hydraulic fluid from the pump 70 to the opposing chambers 62, 64, respectively, of the steering motor 60 in order to provide steering assistance to the steerable wheels 14, 16. When the valve 24 is in the unactuated, neutral position hydraulic fluid is directed through both fluid lines 54, 56 and into both corresponding chambers 62, 64 of the steering motor 60. The hydraulic pressure is the same on each side of the piston 63 and, thus, the motor 60 remains unactuated, i.e., the rod 65 does not move. The hydraulic fluid flows from the chambers 62, 64 back to the reservoir 74.

In operation, when the steering wheel 20 rotates to move the rack portion 30 of the steering member 12 in a first linear direction, e.g., leftward as viewed in FIG. 1, the spring 52 is initially compressed and thereafter applies an axial force to the spool 50 in the first linear direction. This leftward axial force causes the spool 50 and, thus, causes the bracket 59 to move in the leftward direction. This movement of the spool 50 directs hydraulic fluid through the fluid line 56 and into the chamber 64 of the steering motor 60. At the same time, the valve 24 directs fluid from the chamber 62 to the reservoir 74 via the fluid line 54. Fluid pressure built up within the chamber 64 relative to the chamber 62 causes the piston 63 and rod 65 of the motor 60 to move linearly relative to the cylinder 61, e.g., leftward as viewed in FIG. 1. The leftward moving bracket 59 and rod 65 move the steering linkages 17, thereby causing the steerable wheels 14, 16 to turn in a first turning direction.

Likewise, when the steering wheel 20 rotates to move the rack portion 30 of the steering member 12 in a second linear direction opposite to the first direction, e.g., rightward as viewed in FIG. 1, the spring 52 extends, which then applies an axial force to the spool 50 in the second linear direction. This rightward axial force causes the spool 50 and, thus, causes the bracket 59 to move in the rightward direction. This movement of the valve 24 directs hydraulic fluid through the fluid line 54 and into the chamber 62 of the steering motor 60. At the same time, the valve 24 directs fluid from the chamber 64 to the reservoir 74 via the fluid line 56. Fluid pressure built up within the chamber 62 relative to the chamber 64 causes the piston 63 and rod 65 to move linearly relative to the cylinder 61, e.g., rightward as viewed in FIG. 1. The rightward moving bracket 59 and rod 65 move the steering linkages 17, thereby causing the steerable wheels 14, 16 to turn in a second turning direction opposite the first turning direction. Therefore, the steering motor 60 provides steering assist in both turning directions of the steering wheel 20.

The apparatus 10 also includes at least two vehicle condition sensors 82, 84 and an electronic control unit 80 for controlling steering feel of the vehicle based on sensed vehicle conditions. As shown in FIG. 1, the vehicle condition sensors include a steering wheel rotation sensor 82 and a vehicle speed sensor 84 electrically connected to the electronic control unit 80 via leads 86 and 88, respectively. The steering wheel rotation sensor 82 senses the magnitude, rate, and acceleration of rotation of the steering wheel 20 and generates electrical signals indicative of these parameters. The steering wheel rotation sensor 82 may also sense the steering torque. The steering wheel rotation magnitude is the angle of rotation of the steering wheel 20 relative to a straight-ahead position of the steering wheel, i.e., when the steerable wheels 14, 16 are not turned. Rotation of the steering wheel 20 in a first direction may be designated as a positive value and rotation of the steering wheel in a second direction opposite the first direction may be designated as a negative value.

During steering of the vehicle and while the steering motor 60 provides steering assist to the steerable wheels 14, 16 the vehicle speed sensor 84 senses the speed of the vehicle and generates an electrical signal indicative of the speed. The electric signals from the steering wheel rotation sensor 82 and the vehicle speed sensor 84 are sent to the control unit 80 via the leads 86, 88, respectively. The electronic control unit 80 analyzes the output of the two sensors 82 and 84 and effects operation of the motor 42 of the EPS unit 40 as a function of the output of these two sensors. It is contemplated, however, that the electronic control unit 80 may be connected with only the steering wheel rotation sensor 82 or only the vehicle speed sensor 84.

In addition to being responsive to the amount of angular rotation of the steering wheel 20 as well as the vehicle speed, the electronic control unit 80 may have inputs which vary as a function of sensed lateral acceleration of the vehicle (not shown) or other vehicle operating conditions. In any case, the electronic control unit 80 receives the signals generated by the sensors 82, 84 and actuates the EPS unit 40 in order to adjust the torque applied to the steering column 22 and, thus, adjust the torque applied to the steering wheel 20. The electronic control unit 80 therefore effects operation of the EPS unit 40 to resist to rotation of the steering wheel 20 and provide steering "feel" to the operator based on sensed vehicle conditions. The electronic control unit 80 may operate in a manner similar to that described in U.S. Pat. No. 6,546,322 or U.S. Patent Application Publication No. 2010/0070136, the entirety of which are incorporated herein by reference.

The present invention is advantageous in that the EPS unit 40 provides steering feel while the steering motor 60 provides steering assist. Accordingly, the steering motor 60 and the valve 24 can be sized for a heavily loaded axle. On the other hand, the EPS unit 40 may be sized for a smaller vehicle since the EPS unit provides steering feel. Therefore, the same EPS unit 40 can be provided for all vehicles while the steering motor 60 and valve 24 are sized for the specific vehicle. The apparatus 10 of the present invention therefore simplifies and reduces the cost of a steering apparatus across a wide range of vehicles.

From the above description of the invention, those skilled in the art will perceive improvements, changes and modifications. Such improvements, changes and modifications within the skill of the art are intended to be covered by the appended claims.

The invention claimed is:

1. An apparatus for use in turning steerable vehicle wheels, the apparatus comprising:
   a steering member which is linearly movable relative to the vehicle to effect turning movement of the steerable vehicle wheels;
   a pinion disposed in meshing engagement with a rack portion of the steering member;
   a steering column connected with the pinion and with a vehicle steering wheel such that rotation of the steering wheel results in linear movement of the steering member;
   an electrically powered steering unit connected to the steering member for providing steering feel to the operator, the electrically powered steering unit applying an axial force to the steering member in order to resist rotation of the steering wheel; and
   a hydraulic power steering motor mechanically connected to the steering member to provide steering assist to the steerable wheels.

2. The apparatus recited in claim 1 further comprising a controller and at least one vehicle condition sensor for sensing a vehicle condition, the controller receiving an electrical signal from the at least one vehicle condition sensor and operating the electrically powered steering unit in response to the sensed vehicle condition.

3. The apparatus recited in claim 2, wherein the at least one vehicle condition sensor comprises at least one of a steering wheel rotation sensor and a vehicle speed sensor.

4. The apparatus recited in claim 1 further comprising a pump for supplying hydraulic fluid to the hydraulic power steering motor.

5. The apparatus recited in claim 1 further including a valve for directing hydraulic fluid to and from the hydraulic power steering motor for providing steering assist to the steerable wheels.

6. The apparatus recited in claim 5, wherein the valve is a linear valve including a spool that moves axially in response to linear movement of the steering member in order to direct hydraulic fluid to the hydraulic power steering motor.

7. The apparatus recited in claim 5, wherein the valve is mechanically coupled to the steering member, the valve being biased into a first position in which hydraulic fluid is directed to the hydraulic power steering motor without actuating the hydraulic power steering motor, the valve being movable by the steering member into a second position in which hydraulic fluid is directed to the hydraulic power steering motor to actuate the hydraulic power steering motor.

8. The apparatus recited in claim 1, wherein the electrically powered steering unit is mechanically coupled to the steering member.

9. The apparatus recited in claim 1, wherein the electrically powered steering unit includes a motor and a drive belt connected to the steering member for applying an axial force to the steering member.

10. The apparatus recited in claim 1, wherein the electrically powered steering unit is spaced apart from the steering column and the pinion.

11. The apparatus recited in claim 10, wherein the electrically powered steering unit is connected directly to the steering member and directly applies an axial force to the steering member in order to resist rotation of the steering wheel.

12. An apparatus for use in turning steerable vehicle wheels, the apparatus comprising:
   a steering member which is linearly movable relative to the vehicle to effect turning movement of the steerable vehicle wheels;
   a pinion disposed in meshing engagement with a rack portion of the steering member;
   a steering column connected with the pinion and with a vehicle steering wheel such that rotation of the steering wheel results in linear movement of the steering member;
   a controller electrically connected to at least one vehicle condition sensor for sensing a vehicle condition and providing an electrical signal indicative of the sensed vehicle condition;
   an electrically powered steering unit mechanically connected to the steering member and electrically connected to the controller for applying an axial force to the steering member to resist rotation of the steering wheel in response to the sensed vehicle condition for providing steering feel to the operator; and
   a hydraulic power steering motor mechanically connected to the steering member to provide steering assist to the steerable wheels.

13. The apparatus recited in claim 12, wherein the at least one vehicle condition sensor comprises at least one of a steering wheel rotation sensor and a vehicle speed sensor.

14. The apparatus recited in claim 12 further including a valve for directing hydraulic fluid to and from the hydraulic power steering motor for providing steering assist to the steerable wheels.

15. The apparatus recited in claim 14, wherein the valve is a linear valve including a spool that moves axially in response to linear movement of the steering member in order to direct hydraulic fluid to the hydraulic power steering motor.

16. The apparatus recited in claim 14, wherein the valve is mechanically coupled to the steering member, the valve being biased into a first position in which hydraulic fluid is directed to the hydraulic power steering motor without actuating the hydraulic power steering motor, the valve being movable by the steering member into a second position in which hydraulic fluid is directed to the hydraulic power steering motor to actuate the hydraulic power steering motor.

17. The apparatus recited in claim 12 further comprising a pump for supplying hydraulic fluid to the hydraulic power steering motor.

18. The apparatus recited in claim 12, wherein the electrically powered steering unit includes a motor and a drive belt connected to the steering member for applying an axial force to the steering member.

19. The apparatus recited in claim 12, wherein the electrically powered steering unit is spaced apart from the steering column and the pinion.

20. The apparatus recited in claim 19, wherein the electrically powered steering unit is connected directly to the steering member and directly applies an axial force to the steering member in order to resist rotation of the steering wheel.

* * * * *